United States Patent Office 3,431,625
Patented Mar. 11, 1969

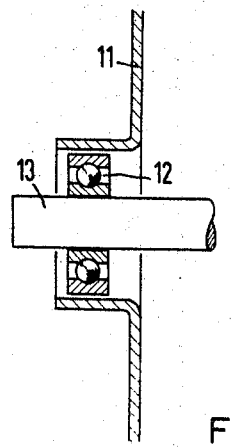
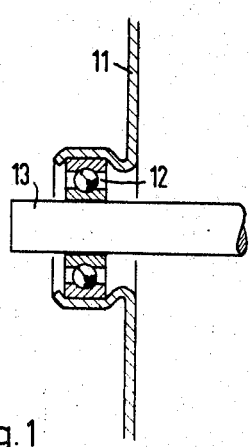
Fig. 1  Fig. 2
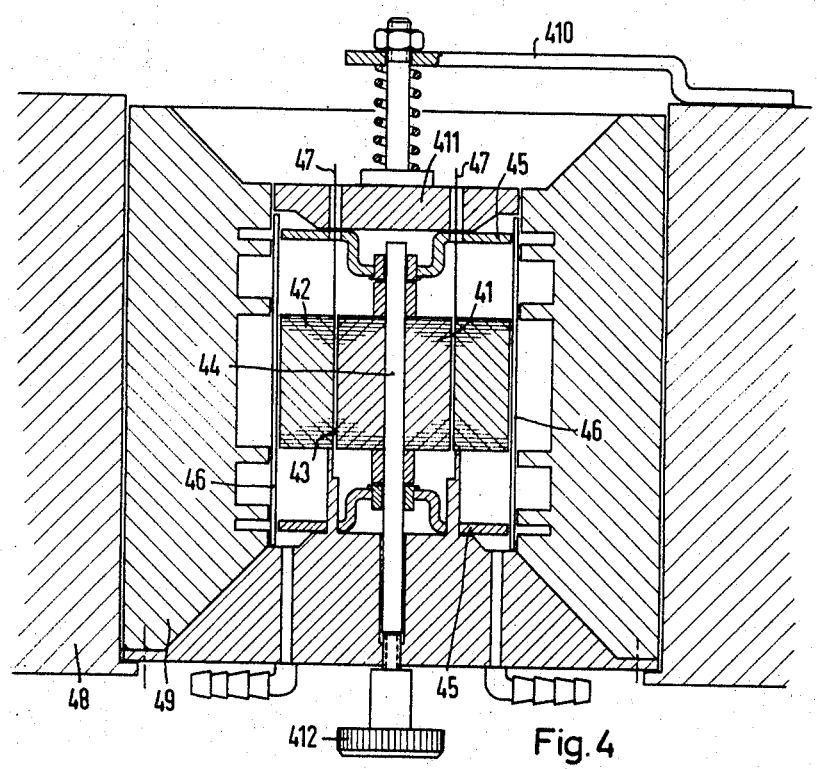
Fig. 4

3,431,625
METHOD FOR THE PRECISE ASSEMBLY OF APPARATUS
Horst Schenk, Erlangen, Karl-Georg Günther, Boxdorf, near Nuremberg, and Wilhelm Külb, Muhlbach, near Bad Neustadt, Germany, assignors to Siemens Aktiengesellschaft, Berlin, Germany, a corporation of Germany
Filed Nov. 10, 1965, Ser. No. 507,131
Claims priority, application Germany, Feb. 20, 1965, S 95,567
U.S. Cl. 29—421      2 Claims
Int. Cl. B21h *1/12;* B21d *53/00*

ABSTRACT OF THE DISCLOSURE

Method of assembling rotary electrical machines with individual components for holding the machine stator and rotor together wherein the individual components have rough tolerances but require precise tolerances at their junctions in the assembled apparatus includes the steps of relatively fixedly positioning with a supporting structure the components in their proper geometric relationship when they are finally assembled, inserting the structure supporting the components into a high capacity forming machine, subjecting the position components supported by the structure to the action of the machine so as to deform and join the components with precise junction tolerances therebetween in the final assembly, and thereafter removing the supporting structure.

---

Our invention relates to methods for assembling apparatus. More particularly, it relates to such methods using high capacity forming processes.

In the U.S. Patent 2,976,907 of G. W. Harvey et al. for "Metal Forming Device and Method," dated Mar. 28, 1961 and assigned to the General Dynamics Corporation, there is disclosed a parts forming method utilizing pulsed strong magnetic fields.

Generally the assembling of apparatus from many individual components thereof requires a precise pre-processing of such components to effect precise generally narrow tolerances. In order to maintain such narrow tolerances, the precision pre-processing of the individual components is first required, such pre-processing entailing considerable expense.

To enable a simpler and less expensive assembling method, the individual components of apparatus are sometimes assembled with aid of a jig and soldered, or glued, or welded together. After they have been so joined the jig is removed. However, the use of the jig presents the disadvantages that the joining techniques such as soldering, gluing, welding or casting, for example, either require the use of elevated temperatures, or they are not sufficiently reliable. A common result is the slow breakdown of the entire apparatus because of a shrinking, warping or changes at the junction points.

Consequently there is a great need for a method for the assembly of constituent components into the final apparatus which would eliminate the above described difficulties.

Accordingly it is an important object of this invention to provide a method for precisely assembling apparatus from components which have not been subjected to a precisioning pre-processing operation and not necessarily having a press fit necessary for their assembly.

This object is achieved by providing a high-capacity forming method for effecting the assembly of components into the final apparatus. By a high capacity forming method, there is meant one in which stored energy is brought to act upon a workpiece in short periods of time, i.e., in pulses. Examples of such forming methods are the magnetic forming method as disclosed in the hereinabove mentioned U.S. Patent 2,976,907, the hydrospark method and the explosion method. The particular advantage presented in the employment of these high-capacity forming methods is that the final apparatus can be assembled from relatively rough, as distinguished from precisely prepared, individual components which do not have a press fit necessary for their assembly. Thus, with these methods, small motors, hollow microwave conductors such as wave guides, bearings for multiple speed change gears, for example, can be assembled with a minimum of difficulty. In addition, such structures as capacitor leads, shaft bearings such as ball bearings, or compressed air drives such as pistons, for example, may be readily finally assembled.

In each instance, the individual components of an apparatus, at most, undergo only a relatively rough, as contrasted with precise, pre-processing, do not possess the necessary press fit, and are first assembled with the aid of a jig. The connection of the individual components is effected by a high-capacity forming method, a preferable method being one providing the electro-dynamic forces of a magnetic forming coil. This may be achieved by enclosing the individual components with a thin-walled metal tube, outer or inner, and by applying the magnetic forming method to the surfaces of the individual components.

However, the individual components themselves may be provided with thin walled extensions or arms which are formed through a high capacity forming method on adjacent components. The magnetic forming method, for example, presents the advantage that the forming pressure produced thereby acts uniformly over a total area and does not require the use of intermediate joining layers such as adhesive, or solder which are subject to shrinkage and aging.

Generally speaking and in accordance with the invention, there is provided a method of assembling apparatus from their individual constituent components wherein such individual components require precise tolerances at their junctions in the finally assembled apparatus comprising the steps of relatively fixedly positioning the components in their proper physically geometric relationship as they are in the finally assembled apparatus with a supporting structure, inserting the structure supporting the components thereon into a high capacity forming machine, and subjecting the positioned components supported by the structure to the action of the machine to join the components with precise junction tolerances therebetween into the final assembly, and thereafter removing the supporting structure.

One high capacity forming machine which may be utilized is a magnetic forming machine, the supporting structure holding the properly positioned components being inserted within the field concentrator of the compression coil of the machine to be subjected to the magnetic pulsing of the machine.

The foregoing and more specific objects of our invention will be apparent from and will be mentioned in the following description of a method for precisely assembling apparatus according to our invention taken in conjunction with the accompanying drawing.

In the drawing, FIG. 1 is a schematic depiction, partly in section, illustrating the assembling of a shaft bearing according to the method of the invention;

FIG. 2 is a schematic diagram partly in section of a compressed air drive finally assembled by the method of the invention;

FIG. 4 is a schematic depiction partly in section of a small motor being assembled from its constituent components by the method of the invention utilizing a magnetic forming technique.

Figure 3:
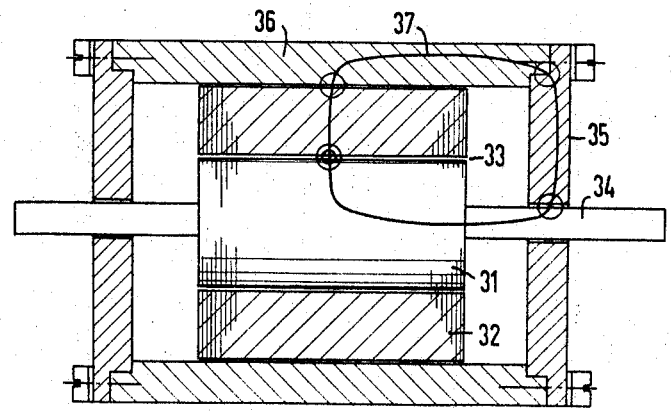
FIG. 3 is a diagram, partly in section, of a conventional small motor.

Referring now to FIG. 1 wherein there is shown the assembly of a shaft bearing by the method according to the invention, the numeral 11 designates therein the supporting plate for the bearing 12, bearing 12 engirdling a shaft 13. The left portion of FIG. 1 shows the arrangement of the individual components prior to the assembly of the shaft bearing with the aid of the high capacity forming method and the right portion of FIG. 1 shows the final assembled shaft bearing after the forming thereof. In the application of the forming method herein, a structure (not shown) holds the support plate 11 and bearing 12 together whereby shaft 13 is disposed perpendicularly to the plane of plate 11. The individual parts thus held together are arranged, for example, in a compression coil of a magnetic forming machine, such compression coil being suitably equipped with appropriate field concentrators. The electro-dynamic action of the compression coil and field concentrators causes the joining of the components as shown in the right portion of FIG. 1 by forming or flanging of the bearing support plate 11.

FIG. 2 shows in section, the individual components of a piston for a compressed air drive. The left half of the figure, as determined by the center broken line therein, shows these individual components prior to their being subjected to the forming process and the right half of the figure shows their assembly after their being subjected to the forming process. In the FIG. 2, the piston is designated by the numeral 21, the numeral 22 designates a spring washer, the numeral 23 designates the sleeve and the spring is designated by the numeral 24. In the final assembly, piston 21 should be connected airtight with sleeve 23. Previously, such air-tight connection could be effected by closely and precisely fitting the piston inside the sleeve and then by compressing the individual components. With the use of the high-capacity forming method of the invention, a precise processing of the individual components is not necessary. By means of the high-capacity forming method, piston 21 is pressed into a peripheral circumferential groove 25 of sleeve 23 thereby also assuring the providing of the proper air density.

Where electric motors are assembled, an air gap of several tenths of a millimeter should be maintained between its rotor and the stack of laminations of the stator. Thereby, the rotor is held through the rotor shaft in the bearing plate. The latter plate bears against the motor housing which envelops the stator stack of laminations.

FIG. 3 is a schematic sectional illustration of a conventional small motor assemby. In this assembly, the rotor bears the numeral 31, numeral 32 designates the stator, the air gaps are designated by the numeral 33, numeral 34 denotes the shaft, the end frames are designated by the numeral 35, the housing bears the numeral 36 and the numeral 37 designates the chain of tolerances. To maintain the desired air gap 33 between the rotor 31 and the stack of laminations, i.e., the stator 32, a number of tolerances must be taken into account, their total number determining the preciseness of the air gap (chain of tolerances). This tolerance chain extends from the desired air gap through the shaft of the motor, the seat of the bearing in the bearing plate, the seat of the bearing plates in the motor housing and the seat of the motor housing on the stator stacks. Since, in the worst possible case, the detailed individual tolerances may become multiplied, they must be kept appropriately small in order to maintain the required air gap tolerance. Such maintaining requires a high degree of precision in the individual components during their fabrication which, of course. entails considerable expense. Accordingly, the objective to attain economical production thereof should lie in the breaking open of the aforedescribed chain of tolerances. The technical solution to this problem is obtained by utilizing a high capacity forming method according to the invention.

FIG. 4 schematically illustrates the assembly of a small motor from its component parts with the magnetic forming method according to the invention. In this figure, the numeral 41 designates the rotors, numeral 42 denotes the stators, numeral 43 designates the air gap, numeral 44 designates the motor shaft, and numeral 45 designates the bearing plates. The tube-shaped housing bears the numeral 46, and air gap needles are designated with the numeral 47. The structure designated with the numeral 48 is the compression coils of a magnetic forming machine, a field concentrator 49 being contained within compression coils 48, the motor components being disposed in appropriate relationship within field concentrator 49. The structure bearing the numeral 410 is a clamping device, the numeral 411 designates a pressure plate, and the numeral 412 denotes and adjusting screw for adjusting the play of the bearing. The individual components comprising the motor are maintained in their proper relationship by clamping device 411, such relationship corresponding to their relationship in the final assembly. The air gap 43 which is to be maintained is determined specifically by the introduction thereinto of air gap needles 47. In the pre-assembled state, the motor is inserted within compression coil 48 of the magnetic forming machine and tube-shaped housing 46 is pressed by magnetic forming pressure against bearing plates 45 which are disposed in their proper position as well as against stator stack 42. After tube-shaped housing 46 has been so pressed against bearing plates 45, and against stator stack 42, needles 47 are removed from the air gaps. The motor is now completely assembled.

Figure 5:
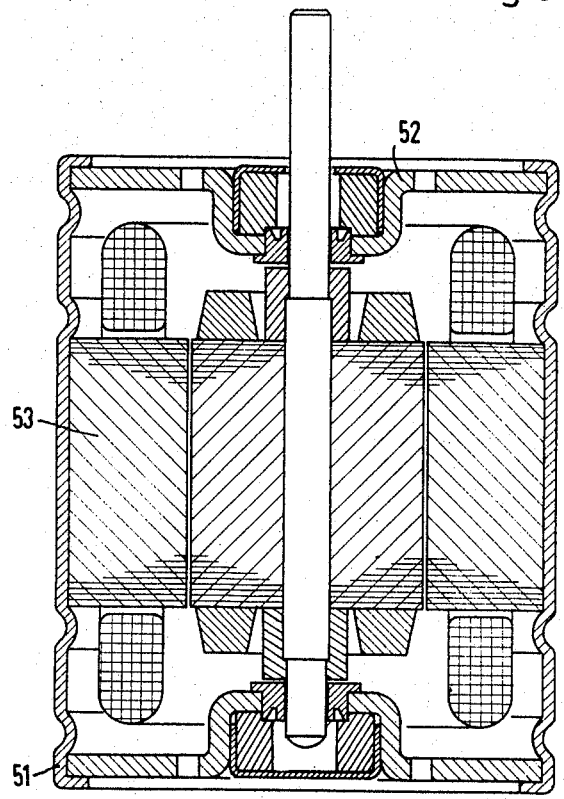
FIG. 5 shows a finally assembled small motor assembled from its constituent components by the method according to the invention.

FIG. 5 is a schematic illustration of a small motor assembly which has been finally assembled by the method according to the invention. In this assembly, the tube-shaped housing 51 therein has been so formed by the electrodynamic forces of the compression coil of the magnetic forming machine such that the bearing plates 52 and the stator stack 53 both are disposed in their proper relative positions.

It will be obvious to those skilled in the art upon studying this disclosure that methods for precisely assembling apparatus from components which have not been subjected to a precisioning operation according to our invention permit of a great variety of modifications and hence can be given embodiments other than those particularly illustrated herein without departing from the essential features of our invention and within the scope of the claims annexed hereto.

We claim:

1. A method of assembling rotary electrical machines with individual components for holding the machine stator and rotor together wherein such individual components have rough tolerances but require precise tolerances at their junctions in the assembled apparatus which comprises the steps of relatively fixedly positioning said components in their proper physically geometric relationship as they are in the finally assembled apparatus, with a supporting structure, inserting said structure supporting said components thereon into a high capacity forming machine, subjecting said positioned components supported by said structure to the action of said machine so as to deform and join said components with precise junction tolerances therebetween into said final assembly, and thereafter removing said supporting structure.

2. A method as defined in claim 1 wherein the high capacity forming machine which is utilized is a magnetic forming machine having a compression coil and a concentrator for concentrating the magnetic field produced by the compression coil, said supporting structure holding said positioned components being inserted within the field concentrator of the compression coil of said machine to be subjected to the magnetic pulsing of said machine.

References Cited
UNITED STATES PATENTS

| | | |
|---|---|---|
| 2,976,907 | 3/1961 | Harvey et al. _____ 72—56 |
| 3,141,236 | 7/1964 | Dunne et al. |
| 3,220,103 | 11/1965 | Simons. |
| 3,252,313 | 5/1966 | Eilers et al. |

THOMAS H. EAGER, *Primary Examiner.*

U.S. Cl. X.R.

29—596, 445, 205, 149.5, 148.4